United States Patent
Kayama et al.

[11] Patent Number: 5,978,851
[45] Date of Patent: Nov. 2, 1999

[54] DISTRIBUTED CONTROL SYSTEM AND METHOD OF CONFIGURING THE SYSTEM

[75] Inventors: Masahiro Kayama; Yasuo Morooka; Toshihiko Matsuda; Yoshihiro Kamigane, all of Hitachi, Japan

[73] Assignee: Hitachi, Ltd., Tokyo, Japan

[21] Appl. No.: 08/553,292

[22] PCT Filed: May 25, 1993

[86] PCT No.: PCT/JP93/00689

§ 371 Date: Nov. 22, 1995

§ 102(e) Date: Nov. 22, 1995

[87] PCT Pub. No.: WO94/28492

PCT Pub. Date: Dec. 8, 1994

[51] Int. Cl.⁶ .............................. G06F 13/42; H04L 12/46
[52] U.S. Cl. ..................... 709/232; 709/233; 370/232; 370/236
[58] Field of Search ................ 395/835, 100.61, 395/200.62, 200.57, 200.47, 200.65, 311, 675, 838, 200.66, 200.61, 200.63; 370/237, 316, 238, 229, 400, 230, 223, 254, 369, 420; 704/24.7; 379/221; 345/113, 114; 364/146; 709/232, 220, 224, 251, 252; 710/10; 714/4; 348/405, 416

[56] References Cited

U.S. PATENT DOCUMENTS

| | | | |
|---|---|---|---|
| 4,403,286 | 9/1983 | Fry et al. | 310/238 |
| 4,669,113 | 5/1987 | Ash et al. | 340/825.03 |
| 4,704,676 | 11/1987 | Flanagan et al. | 364/146 |
| 4,771,391 | 9/1988 | Blasbalg | 395/675 |

FOREIGN PATENT DOCUMENTS 61-97753  5/1986  Japan.
2-81257   3/1990  Japan.

Primary Examiner—Daniel H. Pan
Attorney, Agent, or Firm—Antonelli, Terry, Stout & Kraus

[57] ABSTRACT

A distributed control system has a plurality of controllers, program apparatus, and man-machine systems, which are all interconnected by LAN. The program apparatus is provided with functions corresponding to approval and rejection of operating conditions of the controllers, and a program is allotted to each controller by minimizing the values of the functions. Each controller is structured with the capability of detecting both a load ratio and a traffic quantity of the LAN, on the basis of the detection results, a change of allotment of the program allotted to each controller may be made.

2 Claims, 13 Drawing Sheets

FIG. 2

OPTIMIZATION TABLE 121

FIRST TABLE 125

| CONTROLLER ID | LOAD RATE |
|---|---|
| 1 | 1.0 |
| 2 | 2.0 |
| ⋮ | ⋮ |
| m | 1.5 |

SECOND TABLE 126

| MACRO PROGRAM ID | AMOUNT OF PROCEDURAL OPERATION |
|---|---|
| 1 | 0.15 |
| 2 | 0.22 |
| ⋮ | ⋮ |
| n | 0.51 |

THIRD TABLE 127

| MACRO PROGRAM ID | | 1 | 2 | 3 | ... | n |
|---|---|---|---|---|---|---|
| | 1 | | 0 | 6 | | 32 |
| | 2 | 0 | | 13 | | 5 |
| | 3 | 6 | 13 | | | 17 |
| | ⋮ | | | | | |
| | n | 32 | 5 | 17 | | |

- START
- S20-1: THE EVENT OCCURS
- S20-2: SIMULATION EXECUTION OF THE MACRO PROGRAM
- S20-3: DETECTION OF EXECUTION TIME
- S20-4: FINISHED ?  N (loop back) / Y
- S20-5: GENERATION OF THE SECOND TABLE 126
- END

DATA STORING PART 2010

| MACRO PROGRAM ID | 1 | 2 | ...... | n |
|---|---|---|---|---|
| NUMBER OF EVENTS OCCURRING | 2 | 4 | ...... | 0 |
| EVENT HANDLING TIME  1 | 200 | 62 | | |
|  2 | 182 | 54 | | |
|  3 | | 48 | | |
|  4 | | 61 | | |
|  ⋮ | | | | |
|  N | | | | |

DISTRIBUTED CONTROL SYSTEM AND METHOD OF CONFIGURING THE SYSTEM

This application is a continuation under 35 U.S.C. 371 of PCT/JP93/00689 filed on May 25, 1993, now Pat. No. WO 94/8492.

BACKGROUND OF THE INVENTION

The present invention relates to a distributed control system comprising a plurality of controllers, a program apparatus, and man-machine systems, which are all interconnected by a network and, more specifically, relates to a configuring method including for achieving optimal configuration of large scale control systems.

In a known method for providing programming for a plurality of controllers, system designers define the specification of the macro programs to be executed in the individual controllers on the basis of the expected load rate and of the expected traffic quantity of the network. The designers then further breakdown the specification in terms of the description of the macro programs.

In order to achieve a concrete and visible grasp of the control status of the operated systems, the network monitors and CPU monitors are connected outside the operated system, and the load rate and the traffic quantity of the network are detected individually.

In the above prior art systems, there is no serious problem in the case of small-scale distributed systems having a small number of controllers. In the case of large-scale distributed systems having a large number of controllers, however, there results a problem of overhead for realizing optimal decision for macro programs to be executed in the individual controllers.

In addition, in the prior art, in view of system performance including a balanced distribution of the load rate across the controllers and a minimization of the access occurrence of the network traffic, there is no guarantee that human judgment regarding the allotment of macro programs will reach optimal levels.

Even if the controlled object is determined explicitly, because the number of controllers required for controlling these objects cannot be determined quickly, a large amount of time is spent for specification definition of the distributed systems.

And furthermore, in the actual operation of the distributed control systems after their installation, as the above mentioned external apparatus are necessary for detecting the load rate of the arithmetic unit and the network traffic, the cost of the system increases.

Finally, in the prior art, due to the system performance limitations, the allotment of the control programs cannot be changed dynamically so as to estimate the overall status of the system under operation and optimize the system operation.

The above mentioned problem can be resolved by the following technical means.

SUMMARY OF THE INVENTION

The above problem can be resolved by the program apparatus for deciding optimally the selection of the programs to be executed in the individual controllers, said apparatus comprising an optimization table for storing the load rate of each controller, the procedural rate of each macro program, and the amount of information commonly shared by the individual macro programs, and a multiple objective optimization means for optimizing the operation status of the distributed control system in multiple objective manner in view of the system performance.

As for the guarantee of the optimality of the control system, the optimality can be established by installing a system performance monitoring means for evaluating the optimized configuration of the system through using an energy function and presenting the evaluated result to the user.

In order to support the decision of the number of controllers required for effecting satisfactory control, the solution is to provide the output means with a function for estimating the energy function by varying the number of the controllers and presenting the optimal number of the controllers.

In order to optimize the operation status of the controlled system in real time, the solution is to provide the arithmetic unit of the controller with the first detection means for detecting the load rate, to provide the communication unit with the second detection means for detecting the network traffic, to provide the man-machine apparatus with the control system operation status estimation means for estimating quantitatively the operation status based on the detected results by the first and second detection means and with allotment changing means for prompting the allotment changes so as to minimize the amount of jobs to be executed by the controller in case that the operation status is judged to be improper.

The multiple objective optimization means estimates the load rate of the individual controller from the amount of arithmetic operations by the micro program assigned to the individual controller and the amount of load applied to the controller. The traffic amount of the network is calculated based on the amount of information shared among the micro programs, each assigned to the different controllers. Those estimated values are weighted properly and evaluated under proper constraints such that, for example, the sum of the amount of arithmetic operations by the micro programs assigned to the individual controller should never exceed the total amount of procedural steps of the controller. And then, the optimal allotment of programs is established and the system performance of the control system is optimized. In case that the optimal allotment of programs cannot be realized physically due to the fewer number of controllers, the number of controllers required to be added is estimated based on the result of the optimization procedure with the number of controllers being varied. In case that the controlled object is explicitly given by the user, the number of the controllers required for controlling this controlled object properly is proposed to the user by the above described optimization procedure with the number of the number of controllers being varied as well.

The system performance monitoring means defines the performance index, for example, energy function, describing how far the allotment of the macro programs are optimized, and calculates the value of the performance index and displays the calculated result.

The first detection means is realized as a part of functions provided by an OS (Operating System) embedded in the arithmetic unit of the controller, and detects the load rate of the controller and the margin of the amount of the arithmetic operations. The second detection means is also realized as a part of functions provided by OS embedded in the communication unit, and detects the network traffic and the occurrence of the access operation of the individual controller to the network. The control system operation status quantifying means evaluates totally the detected values obtained by the first and the second detection means, and quantifies the load distribution among the controllers and the distribution of the occurrence of the access operations to the network. The allotment means determines the strategy for reducing the unbalanced distribution in the evaluated values above with minimal change procedures based on the above quantified result, and then gives the change scheme of the allotment of macro programs executed by the individual controllers. In case that the performance of the control system cannot be adequately improved even by the allotment change described above, the message reporting this situation is issued to the user via the output means of the man-machine apparatus.

BRIEF DESCRIPTION OF THE DRAWINGS

FIG. 2 is a configuration diagram of the optimization table in the present invention.

DESCRIPTION OF THE PREFERRED EMBODIMENTS

Figure 1:
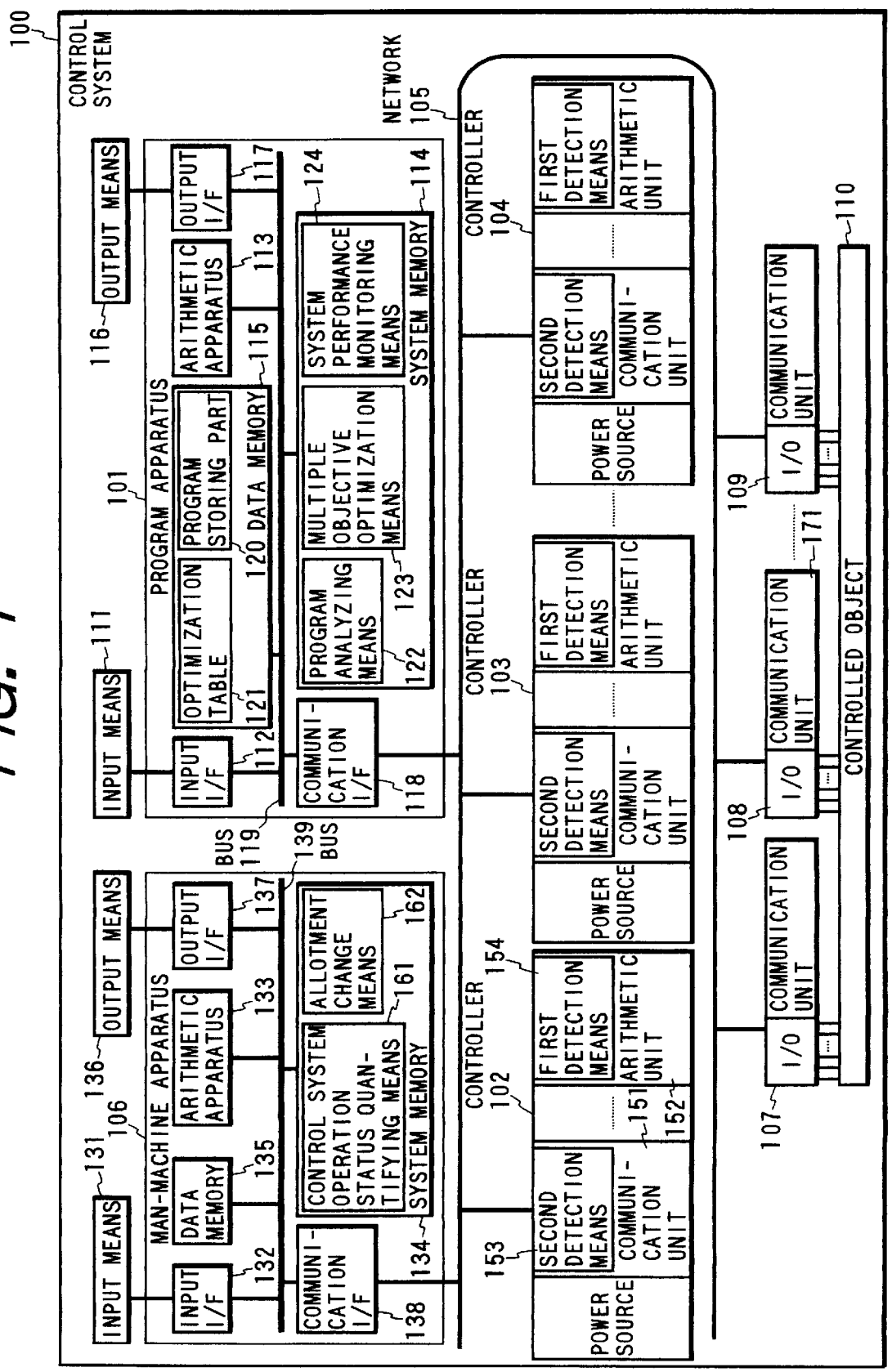
FIG. 1 is a configuration diagram of the distributed control system showing one embodiment of the present invention.

The following is a detailed description, in conjunction with the accompanying drawing figures, of the disclosed embodiments exemplifying the present invention. In FIG. 1 shows a configuration of a control system realized in accordance with the present invention. Facing the programming apparatus 101, the user inputs the macro programs making the controlled object 110 operate with the input device 111 such as keyboard. The input program is transferred to the program storing part 120 in the data memory 115 through the input interface 112 and the bus 119, and stored into the program storing part 120. The stored program is downloaded into the controllers 102 to 104 through the communication interface 118 and network 105 in response to the command input by the user with the input device 111. The downloaded program is sent and received through the communication unit 151, and then the arithmetic unit 152 of the controllers 102 to 104 executes the arithmetic operation for the control signal operating the controlled object 110 in response to the macro program. The macro program means a unit of program executed in a single controller.

The controllers 102 to 104 capture the status signals of the controlled object 110 through the control communication unit 171 from I/O 107 to 109 via the network 105. The control signal for operating the controlled object 110 is supplied, also, to the controlled object 110 through the I/0107 to 109 via the communication unit 171 and the network 105. The status signal of the controlled object 110 and the status information of the controllers 102 to 104 are transferred to the man-machine apparatus 106 via the communication network 151 and the network 105, if necessary.

The control system operation status quantifying means 161 installed in the man-machine apparatus 106 captures the information obtained by the first detection means 154 for detecting the load rate of the individual controllers 102 to 104 or the margin of the amount of the arithmetic operations, and the second detection means for detecting the traffic on the network 105 and the access occurrence of the individual controllers 102 to 104, and then judges the operation status of the overall control system. The result of this judgment is displayed to the user through the output means 136 in the man-machine apparatus 106. In case that the operation status of the overall control system is not adequate, the allotment of the programs is changed by the allotment change means 162.

Next, the operation of the individual parts of the system will be described. The arithmetic apparatus 113 of the program apparatus 101 executes various arithmetic operations in accordance with the algorithms stored in the system memory 114. Data required for those arithmetic operations are stored in the data memory 115. The execution results and the working data are, if necessary, displayed on the display means 116 such as display screens and printers, and presented to the user.

The optimization table 121 implemented in the present invention is included in the data memory 115; and the program analysis means 122, the multiple objective optimization means 123 and the system performance monitor means 124 are included in the system memory 114. The program analysis means 122 analyzes the content of the program stored in the program storage means 120, and generates the optimization table 121 along with the information inputted by the user. The multiple objective optimization means 123 determines the allotment of the micro programs onto the controllers by referring to the optimization table 121.

The system performance monitoring means 124 defines the information related to the result of the optimized allotment, the quantitative measure of optimization, and, if an unsatisfactory optimization result is obtained, the number of controllers required to be newly added to achieve an optimal allotment, and then, the means 124 supplies the information to the output means 116 through the bus 119 and the output interface 117.

Next, the newly realized part in the present invention is described in detail. In FIG. 2, the structure of the optimization table 121 is shown. The optimization table 121 is composed of three tables. In the first table 125, the load rate of the individual controllers is stored, each value of which is put into the table manually by the user with the input device 111. The value of the load rate shown in FIG. 2 is a relative value with the condition that the value of the base module, among a plurality of modules comprising the controller, is supposed to be 1. However, the value defined here may be one defined as a benchmark reflecting the arithmetic performance of the controller, or the number of procedural steps in the macro program executable in a unit time.

In the second table 126, what is stored is the amount of procedural operations of the individual macro program described separately. In FIG. 2, the entity of the second table 126 represents a relative value of the procedural operations with the condition that the number of procedural steps of the base module executable in a unit time is supposed to be 1.0. However, the value of the entity may be allowed to be the number of procedural steps of the macro program itself, or the size of the area in the memory occupied by the individual macro program. It may be allowed that the user write directly the exact value into the table.

The process for obtaining the amount of procedural steps is performed by the program analysis means 122, which will be described with FIG. 3. In the third table 127, the amount of information shared among the distinctive macro programs is stored. The process for obtaining the amount of information is similarly performed in the program analysis means 122.

Figure 3:
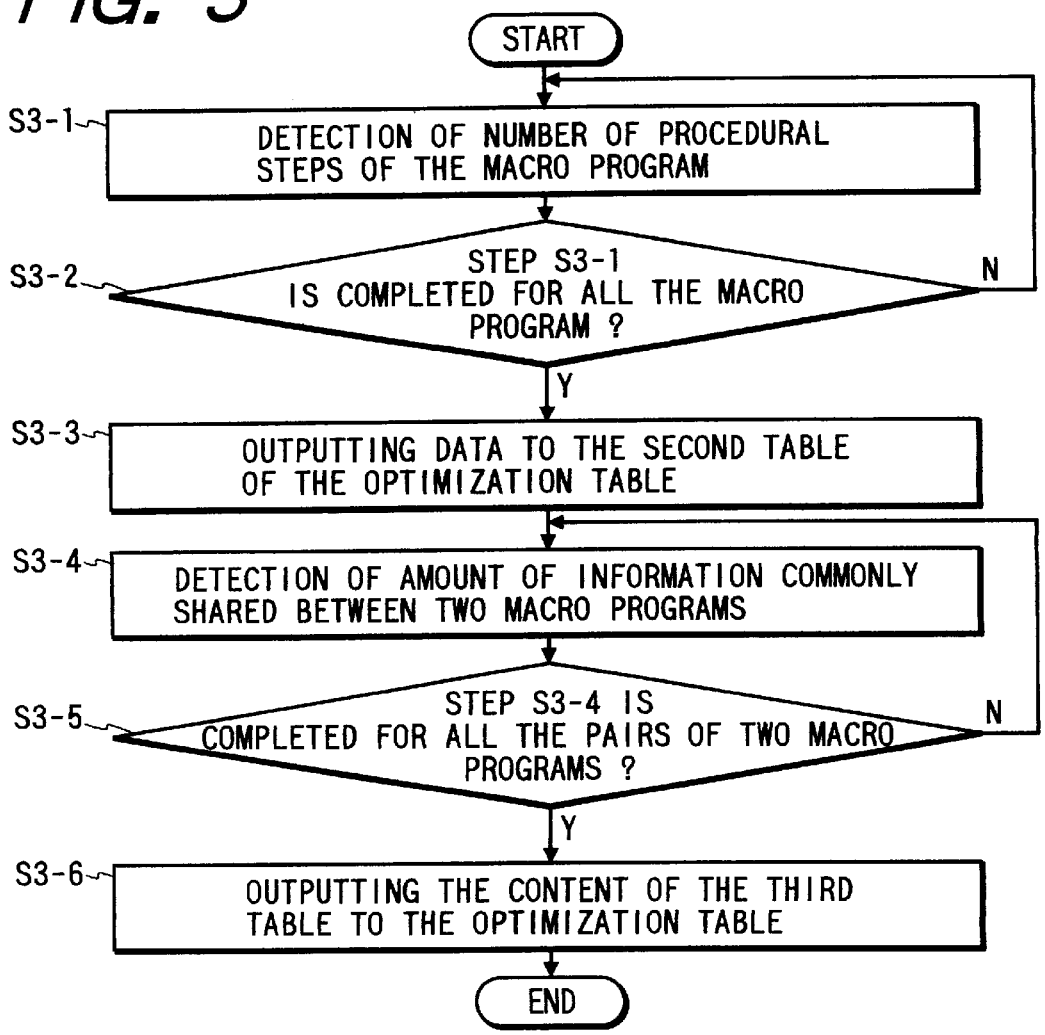
FIG. 3 is a flow chart of procedures executed by the program analysis means.

What is shown in FIG. 3 is a flowchart showing the algorithm executed by the program analysis means 122. At first, in Step S3-1, the number of steps of the individual macro programs stored in the program storing part 120 is detected. For controllers 102 to 104, what is generally used is a programmable controller, an instrument loop controller, and an EIC controller. "EIC" controller designates an integrated controller including functions for Electric control, Instrument control and Computer control. As those controllers use macro programs in which branch and/or repetitive schemes are not almost described, the execution time of the individual macro program can be estimated accurately by evaluating the number of procedural steps in the program.

In Step S3-2, judged is whether the detection of the number of procedural steps is completed for all the macro programs. In case that the detection is not completed, the Step S3-1 is repeated again for the rest of macro programs. In case that the detection is fully completed, going to Step S3-3, the value corresponding to the detected number of procedural steps of the individual macro program is defined as the amount of procedural steps, and then stored in the second table 126.

In Step S3-4, the amount of information shared between a pair of micro programs is detected. Though the micro program is highly independent of the individual controller, there may be a case that an information common to the macro programs is necessary in order to manage the overall control system. The amount of this commonly shared information may be determined by measuring the number of I/O data commonly used, which can be obtained by analyzing the macro programs.

Figure 4A:
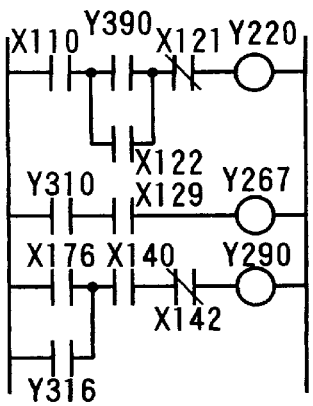
FIGS. 4(a) and 4(b) show examples of the case that the macro program is a ladder diagram.
Figure 4B:
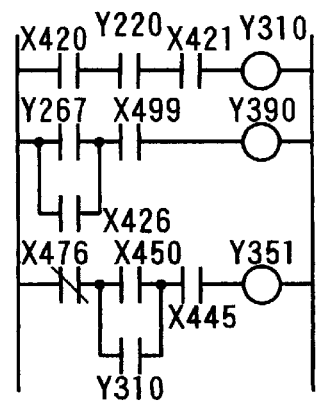

In FIGS. 4(a) and 4(b) the method of analyzing the macro programs is by defining the macro program in terms of ladder a diagram. FIGS. 4(a) and 4(b) illustrate a couple of macro programs and (b), in which symbols X110, Y390 and others represent the address pointing to the area of the corresponding I/O signal. For example, in the first line of the macro program (a), a signal "1" is supplied to the address Y220 when the logical value of the following is true:

$$(X110=1) \cap \{(Y390=1) \cup (X122=1)\} \cap (X121=0).$$

In this logical expression, Y390 and Y391 used in the macro program (a) represent the information generated by the arithmetic operation of the macro program (b). Y220 and Y267 used in the macro program (b) represent the information generated by the arithmetic operation of the macro program (a). In case that these macro programs (a) and (b) are executed in the separate controllers respectively, that information should be sent and received through the network 105. In case of FIG. 4, what is detected by the procedure of Step S3-4 in FIG. 3 is a fact that the amount of commonly shared information is "4".

In Step S3-5, judged is whether the detection of the amount of commonly shared information is completed for all the pairs of macro programs. In case that the detection is not completed, the Step S3-4 is repeated again for the rest of the pairs of macro programs. In case that the detection is fully completed, going to Step S3-6, the value corresponding to the commonly shared I/O signals among the macro programs (this value is "4" in the example shown in FIG. 4) is stored in the third table 127 as the amount of commonly shared information.

Figure 5:
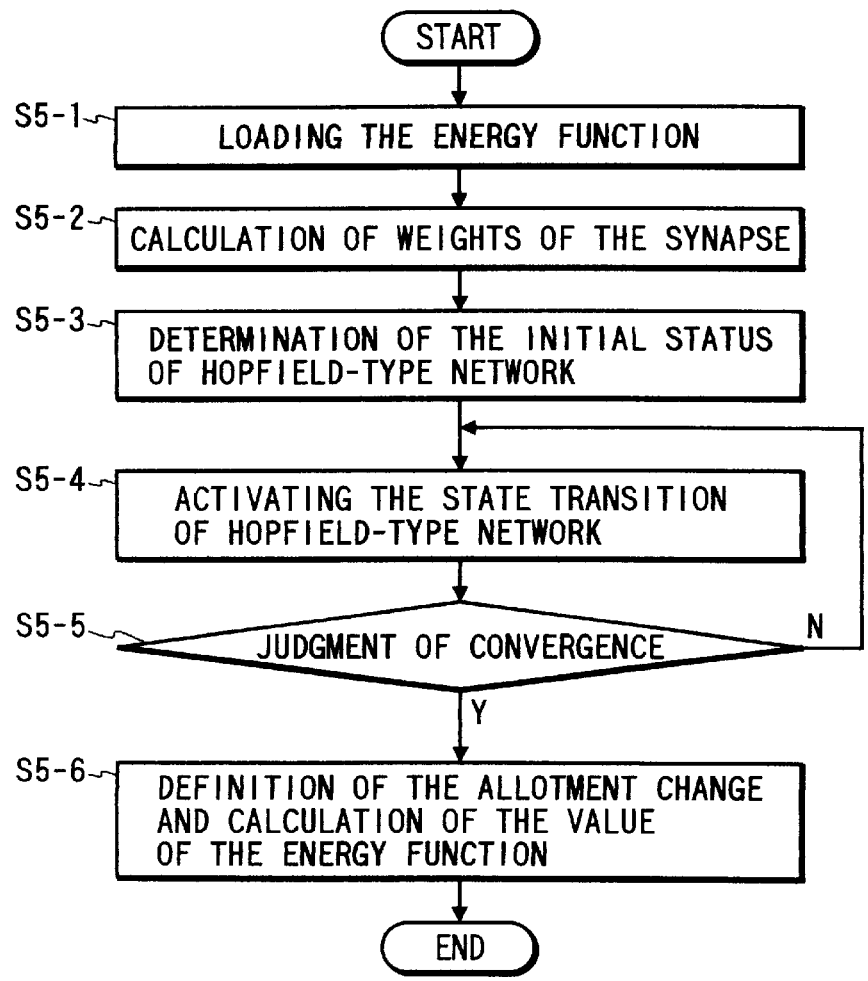
FIG. 5 is one embodiment of the flow chart of procedures executed by the multiple objective optimization means.

In FIG. 5, a flowchart showing the algorithm executed by the multiple objective optimization means 123 is shown. In FIG. 5, what is shown is an example used for solving combinatorial optimization problems in polynomial time. One of the resources for Hopfield-type neural network is "Neural Network Information Processing" by Hideki Asou, Sangyou-Tosho Publishing Co., designated as Ref. 1 below.

Figure 6:
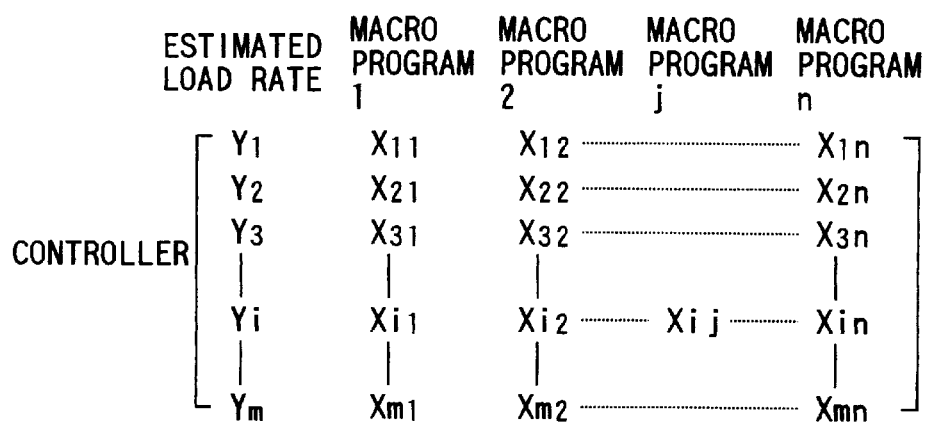
FIG. 6 is a relation formula between the macro program corresponding to the individual controller and the estimated load rate.

At first, In Step S5-1, the energy function determined beforehand is read out from the system memory 114. In order to define the energy function, it is necessary to formulate the mapping for allotment of the macro programs onto the controllers, which is described in the form as shown in FIG. 6. At the defined allotment mapping, the value of the state variable Xij is 1 or 0, in which the value of "1" means that the macro program j is executed at the controller i, and the value of "0" means that the macro program j is not executed at the controller i. The state variable Yi corresponds to the estimated load rate of the controller i, the value of which takes an arbitrary value between 0 and 1. The estimated load rate is the sum of the amount of procedural steps of macro programs dispatched to one of the controllers 101 to 104 divided by the load rate of the corresponding controller. The energy function is represented by the following formula with those state variables as shown below.

$$E = \omega_1 E_1 + \omega_2 E_2 + \omega_3 E_3 + \omega_4 E_4,$$

where $$E_1 = \sum_{j}^{n} \left( \sum_{i}^{m} X_{ij} - 1 \right)^2 \quad \text{(Formula 1)}$$

$$E_2 = \sum_{i}^{m} \left\{ \left( \sum_{j}^{n} L_j \cdot X_{ij} - Z_i \right)^2 / F_i^2 \right\}$$

$$E_3 = \sum_{i}^{m} \left\{ \sum_{j}^{n} \sum_{k(J \neq k)}^{n} N_{jk} \cdot X_{ij}(1 - X_{ik}) \right\}$$

$$E_4 = \sum_{i}^{m} \left\{ \left( F_i \cdot Y_i - \sum_{j}^{n} L_j \cdot X_{ij} \right)^2 \right\} / F_i^2$$

$$Z_i = \left( \sum_{j}^{m} L_j \right) \cdot F_i / \sum_{i}^{m} F_i$$

$F_i$: the load rate of the controller i, $L_j$: the amount of procedural operations of the macro program j, Njk: the amount of information commonly shared by the macro program j and the macro program k, and $w_1$, $w_2$, $w_3$, $w_4$: constant.

The energy function E corresponds to the allotment status of the macro programs and the controllers. The smaller value of E corresponds to the better allotment status. In the formula 1, E is the summation of the sub-energy functions, $E_1$ to $E_4$.

In the above formula, $E_1$ is the constraint condition for preventing a single program from being executed in several different controllers, and when $E_1 = 0$, the constraint condition is satisfied. $E_2$ is an objective function representing how well the macro programs are uniformly distributed to the individual controllers, in which the smaller value of $E_2$ indicates more uniform distribution of the estimated load rate of the individual controllers. $E_3$, corresponding to the network traffic, is an objective function used for measuring the smallness of the network load, which becomes a smaller value as the amount of commonly shared information among the controllers is made smaller. $E_4$ is a constraint condition similar to $E_1$, and becomes positive when the summation of the amount of procedural operations of macro programs in any controller exceed the load capacitance of this controller due to the excess allotment of macro programs, and $E_4$ is zero if not so.

The characteristic of sub-energy functions $E_1$ to $E_4$ is not limited to that shown in the formula 1, but also may be allowed to be one that takes its minimum value when the objective and the constraints are satisfied properly. The constants $w_1$, $w_2$, $w_3$, and $w_4$ are inputted by the user with the input device 111. In general, $w_1$ and $w_4$ are larger than $w_2$ and $w_3$. In case of respecting the condition for obtaining the uniform distribution of the estimated load rate of the individual controllers, the coefficient $w_2$ in $E_2$ is made to be larger than the coefficient $w_3$ in $E_3$. In contrast, if respecting the minimization of the network load, the coefficient $w_3$ in $E_3$ is made to be larger than the coefficient $w_2$ in $E_2$.

Next, in Step S5-2, the weight for synapse is calculated. The individual state variable shown in FIG. 6 is made assigned to its corresponding neutron, and implemented on the network defined in the form shown in FIG. 7. The energy function E' is defined as in $$E^2 = -(1/2) \sum_{i}^{m} \sum_{i'}^{m} \sum_{j}^{n} \sum_{j'}^{n} W_{iji'j'} \cdot X_{ij} \cdot X_{i'j'} - \quad \text{(Formula 2)}$$

$$\sum_{i}^{m} \sum_{j}^{n} \theta_{ij} \cdot X_{ij}.$$

Figure 7:
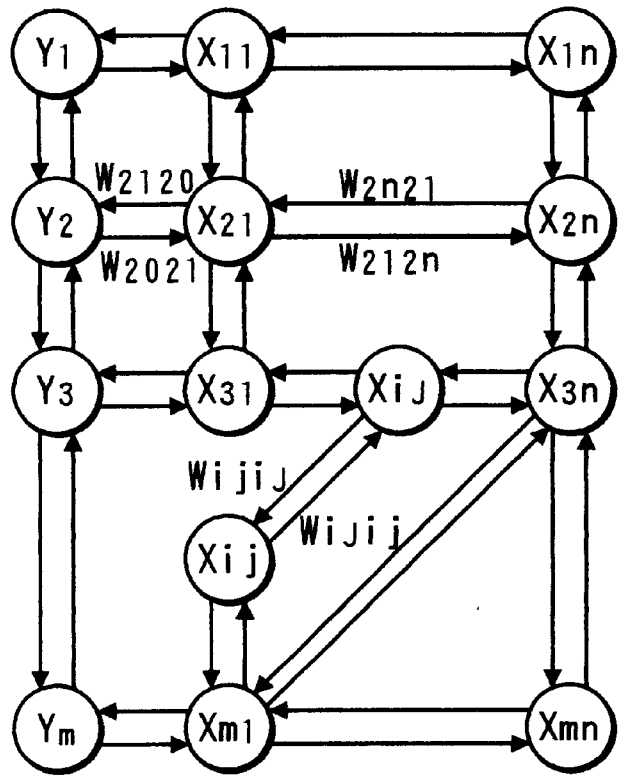
FIG. 7 is a corresponding relation diagram of the synapse linking between the macro program and the estimated load rate via neural network.

By comparing E defined in the formula 1 and E' in the formula 2, the parameters $W_{iji'j'}$ and $\theta_{ij}$ in the formula 2 are defined as the weights of the synapse in FIG. 7.

In Step S5-3, adequate values are assigned to the state variables $Y_i$ an $X_{ij}$ for their initial value, and in general, random numbers are used.

In Step S5-4, the values of the state variables $Y_i$ and $X_{ij}$ are incremented from their initial values in a stepwise manner so that the value of E decreases. State transition algorithms in a Hopfield network are described in detail in the above mentioned reference, Ref. 1, and others. For example, with respect to the neutron $X_{ij}$ extracted, DE defined as below is calculated.

$$\Delta E = \sum_{i'}^{m} \sum_{j'}^{n} W_{iji'j'} \cdot X_{i'j'} - \theta_{ij}, \quad \text{(Formula 3)}$$

where $i \neq i'$ and $j \neq j'$.
And then, if the value of DE is positive, xij is set to be 1, and otherwise, that is negative, Xij is set to be 0, which will be repeated. The value of Yi can be obtained by the formula 4.

$$Y_i = \sum_{i}^{m} X_{ij} \cdot L_j. \quad \text{(Formula 4)}$$

In Step S5-5, whether the state transition of the network is converged or not is judged. This judgment is based upon whether the value of E becomes less than or equal to the allowable value or whether the state of the network is not incremented even if the iterative procedure of Step S5-4 is attempted further. In the latter case, the judgment of convergence may be done by detecting the unchanged behavior of the network by evaluating the value of $X_{11}$ to $X_{mn}$. If the convergence of the transition state of the network is not established, going back to the first step in Step S5-4, the state transition algorithm for the network is repeated.

In case that the convergence is established, the obtained state of the network, 1 or 0 value of the individual Xij's in FIG. 6, is used as the final allotment information of the macro programs onto the controllers, and then the value of the energy function E is calculated. The judgment of convergence behavior in STEP S5-5 is not necessarily done every time in the increment of the transition state, and the number of the procedures for judgment can be reduced by setting the timing of judgment as the time when the incremental process is completed for all the neurons.

The system performance monitoring means 124 transfers the value of the energy function E calculated by the multiple objective optimization means 123 to the output means 116 at the arbitrary timing or at the request of the user.

Figure 8:
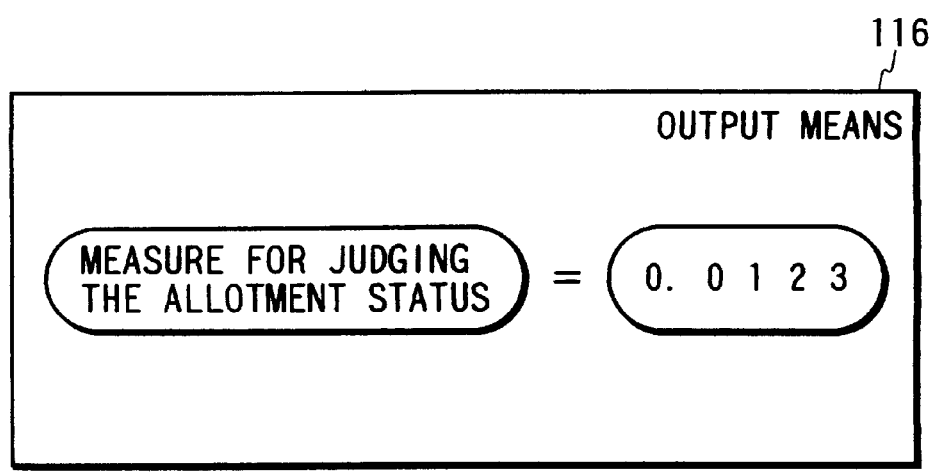
FIG. 8 is a display screen showing the allotment status.

In FIG. 8, an embodiment of displaying the value of the energy function is shown in a case in which the output means 116 is a display screen. The value of the energy is displayed as the allotment status index with its optimal value being 0. This value is used to recognize how well the allotment of present tasks can be optimized. In place of using the absolute value, what can be used as display information may be defined in text format, for example, "Good", "A relatively large unbalance in the load rate of the controllers" and so on. It may be easy to display the process of optimization visually in a time series.

Figure 9:
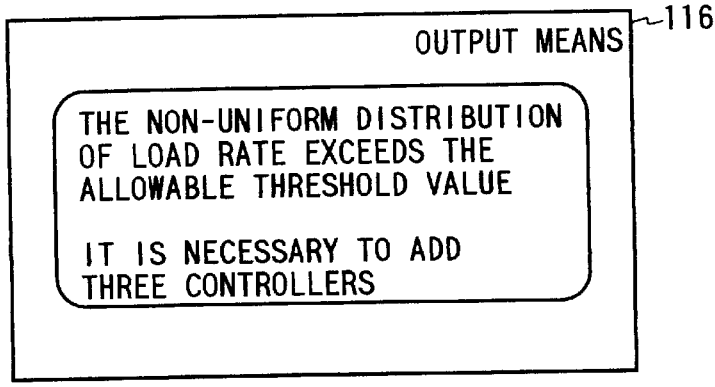
FIG. 9 is a display screen showing the number of controllers to be added.

In case that the optimization result does not reach a designated level even if the algorithm in FIG. 5 converges, it is possible to display the information reporting that a necessary number of controllers should be added. In this case, the value of the energy function E is calculated by the algorithm shown in FIG. 5 with the number of controllers being increased in a stepwise manner until the designated convergence value of the energy function E is established. In FIG. 9, an example is shown with the number of controllers required to be added displayed on the output means 136. It is allowed to estimate the required specification of the network 105 by analyzing the estimated value of the traffic of the network 105 and to display the estimated result.

In the example shown in FIG. 5, as for the algorithm executed by the multiple objective optimization means 123, Hopfield-type neural network is used. Alternately, well-known optimization methods including Pair-Wise method, Min-Cut method and Simulated Annealing method can be supposed to be applied.

Figure 10:
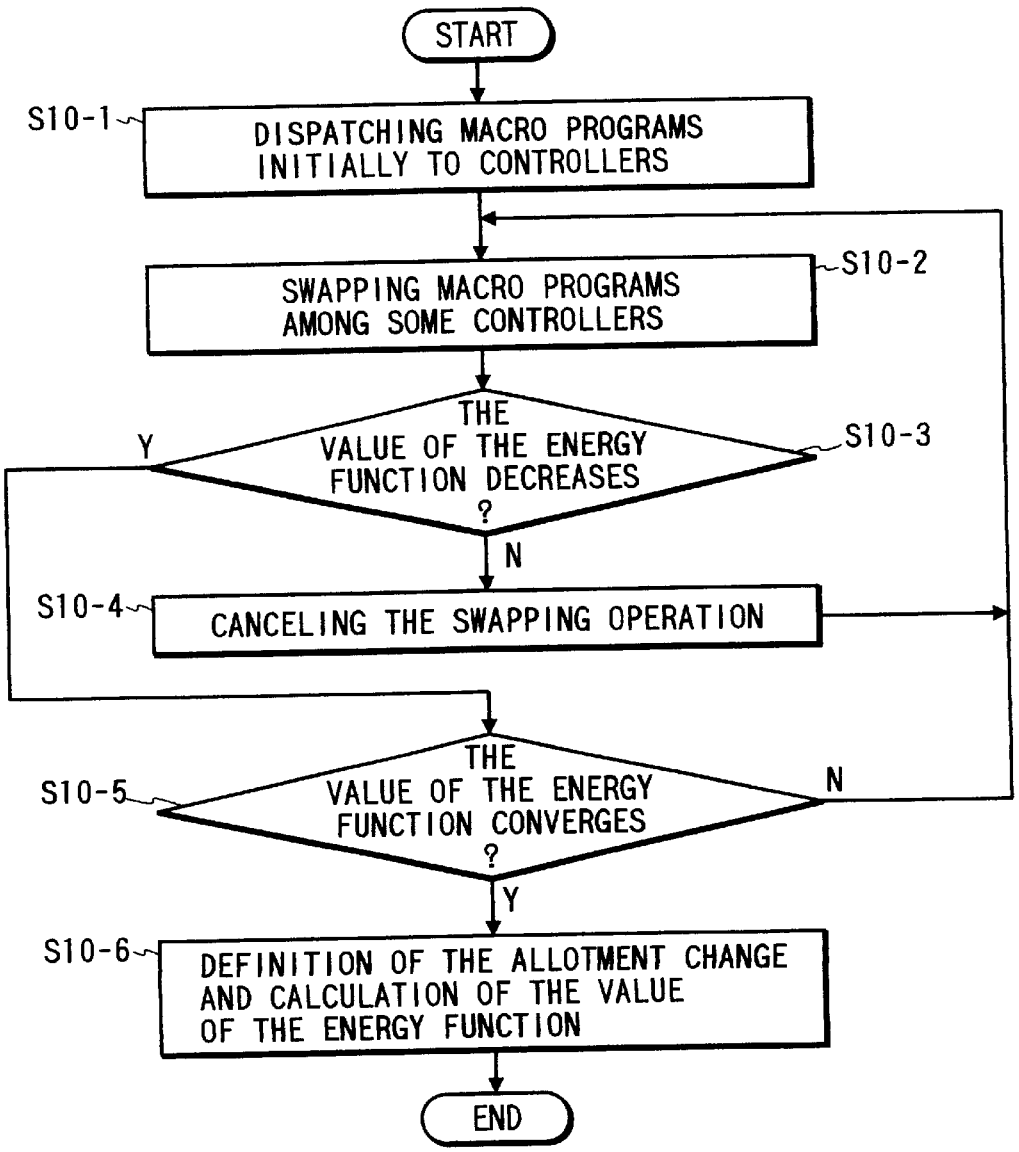
FIG. 10 is another embodiment of the flow chart of procedures executed by the multiple objective optimization means.

In FIG. 10, an example of the algorithm using Pair-Wise method is shown. In Step S10-1, the initial condition is established with an arbitrary allotment of macro programs onto the controllers 102 to 104. Next, in Step S10-2, the macro programs are swapped between a plurality of controllers. For example in swapping between a plurality of controllers, in case of two controllers, it is possible to exchange directly the whole set of macro programs assigned to the individual controller between two controllers.

In Step S10-3, the value of the energy indicating the measure of the status of the macro program allotment resulting from the above swapping of macro programs is calculated, and the difference between the "before" and the "after" for swapping is evaluated. The value of the energy is, for example, obtained by the formula 1. In case that the value of the energy function does not decrease after swapping, the swapping of macro programs is canceled in Step S104 before going back to S10-2, followed by trying another combination of controllers for swapping in the repetitive procedures in Step S10-2 and Step S10-3. In case that the value of the energy function decreases after swapping, whether the allotment status of macro programs reaches convergence or not is judged in Step S10-5. In Step S10-5, whether the value of E becomes less than or equal to the allowable value or whether the state of the network is not incremented even if the iterative procedures of Step S10-2 and Step S10-3 are attempted further. If the convergence is not established, the procedure returns to the Step S10-2 so that, the above described algorithm is repeated. In case that the convergence is established, going to Step S10-6, the obtained state of the network is used as the final allotment information of the macro programs onto the controllers, and then the value of the energy function E is calculated.

In case of swapping macro programs among three or more controllers, it may be possible to swap macro programs in a proper swapping strategy similarly. For example, suppose a case that three controllers, A, B and C, swap macro programs a, b and c, each initially dispatched to controllers A, B and C, respectively. It is allowed that the controller A takes the macro program b for a, the controller B takes the macro program c for b, and the controller C takes the macro program a for c.

Figure 11:
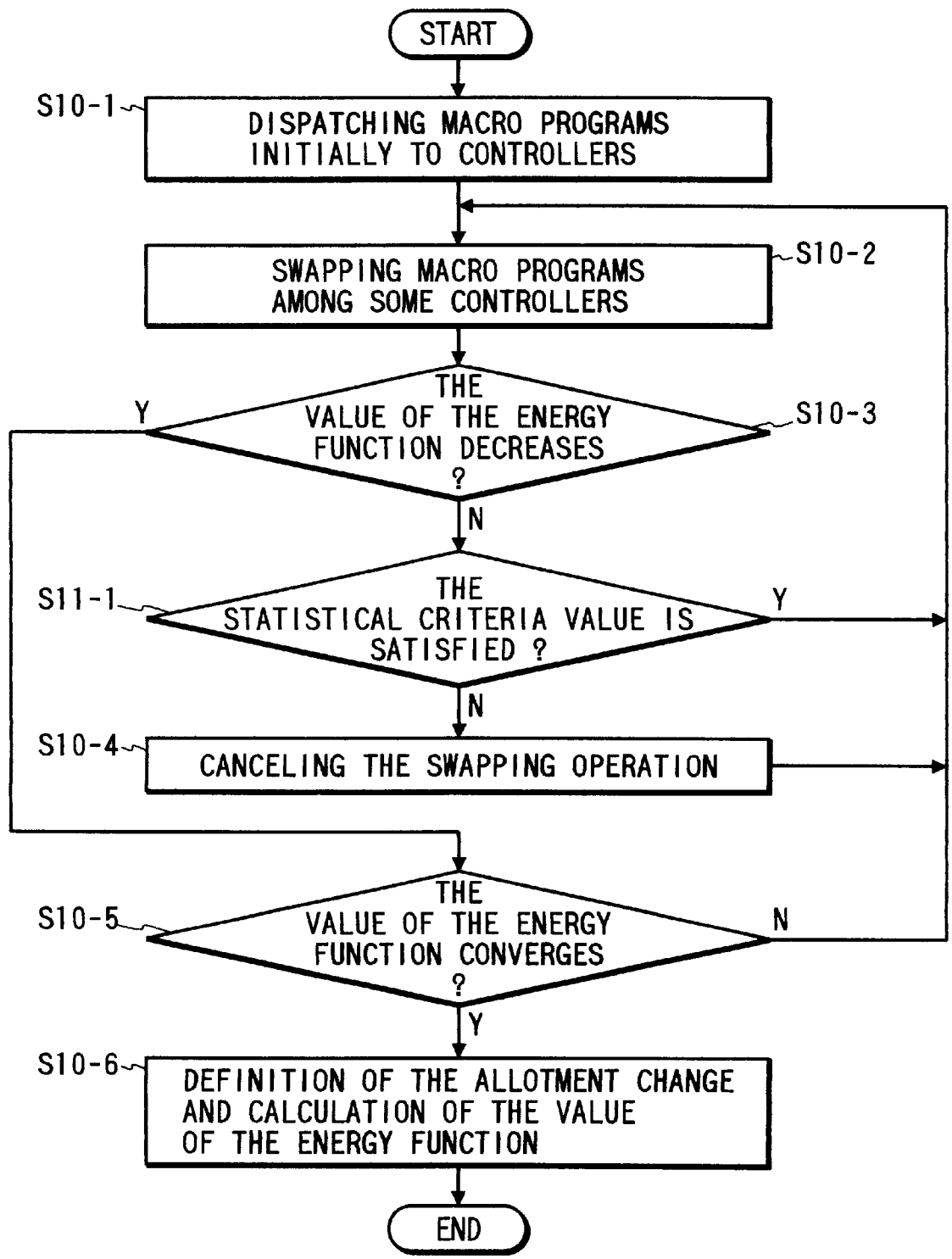
FIG. 11 is another still embodiment of the flow chart of procedures executed by the multiple objective optimization means.

In FIG. 11, an example of the algorithm using a Simulated Annealing method is shown. The basic difference from the case using Pair-Wise method is to introduce stochastic procedures in Step S11-1. Even in case of Step S10-3 judging that the value of the energy function does not decrease, the procedure for canceling the swapped result in Step S104 is skipped when the statistical criteria value given by Step S11-1 is satisfied, and Step S10-2 is selected instead.

The statistical procedure is ordinarily done in Monte-Carlo manner, in which the stochastic value becomes increased as the procedure continues, and the occurrence of the satisfactory stochastic value obtained in Step S11-1 is forced to be reduced. Though the computation time spent for obtaining the converged state is made longer due to the additive procedure in Step 11-1, it is possible to increase the quality of solution at the established convergence, that is, make the value of the energy function smaller.

Figure 12:
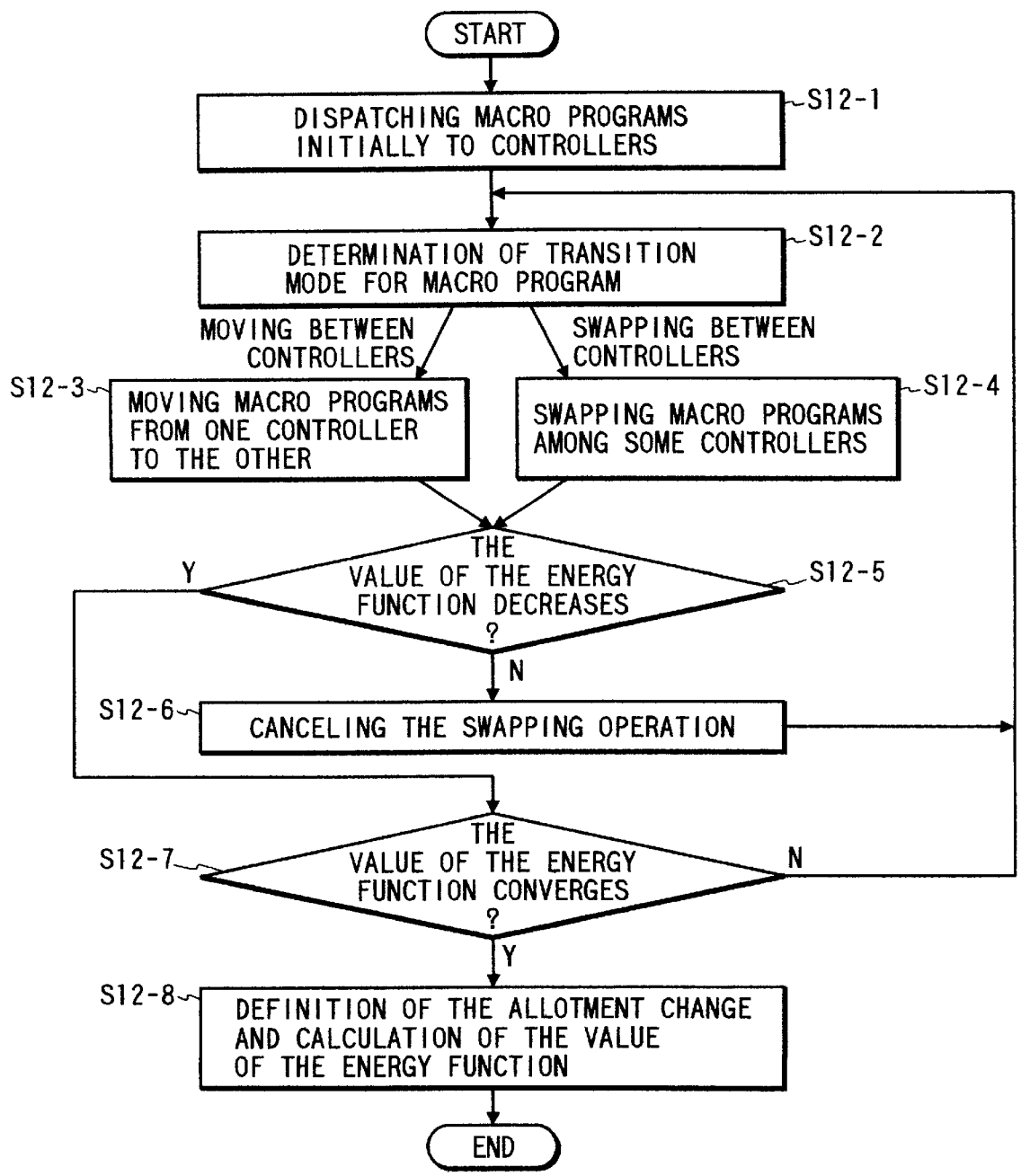
FIG. 12 is a flow chart of procedures for the allotment of the macro programs in another embodiment of the present invention.

In FIG. 12, for another embodiment of the present invention, an algorithm for obtaining faster the solution with a definite level. At first, in Step S12-1, the initial condition is established with an arbitrary allotment of macro programs onto the controllers. Next, in Step S12-2, the transition mode of the macro program is determined. The transition modes used in the algorithm shown in FIG. 12 include that the macro program in one side of a couple of controllers is moved to the other side of controllers, and that a couple of macro programs are swapped between a couple of controllers. In accordance with the formulation in FIG. 6, those modes can be interpreted as that in which the current state of allotment is transferred to the next state located relatively in the Humming Distance which is "2", and that the current state of allotment is transferred to the next state located relatively in the Humming Distance which is "4", respectively. The Humming Distance is not limited to those values but can be selected to others corresponding to various transition modes.

In case that the one-way movement of a single macro program is selected as the transition mode, its corresponding procedure is done in Step S12-3. On the other hand, in case that the swapping of a couple of macro programs is selected as the transition mode, its corresponding procedure is done in Step S12-4. Those selections can be done alternately, or the procedures corresponding to one of these two modes, "one-way movement" or "swapping", are selected first for repetition, and next, the procedures corresponding to the other are selected for repetition.

In Step 12-5, a judgment is made as to whether the value of the energy function is decreased decrease or not. In case that the value does not decrease, that is, there is no improvement even by programs' movement or swapping, the procedure in Step S12-6 is performed which cancels the procedure in Step S12-3, and finally, returns to the procedure in Step S12-2. In case that the value of the energy function decreases, going to Step S12-7, a judgment is made as to whether the convergence of the value of the energy function is established or not. In the case in which the convergence is established, in Step S12-8, the allotment of the macro programs onto the controllers is fixed, and the resultant value of the energy function is calculated. If convergence is not established, the procedure returns to Step S12-2, the algorithm for establishing the convergence is repeated again.

Figure 13:
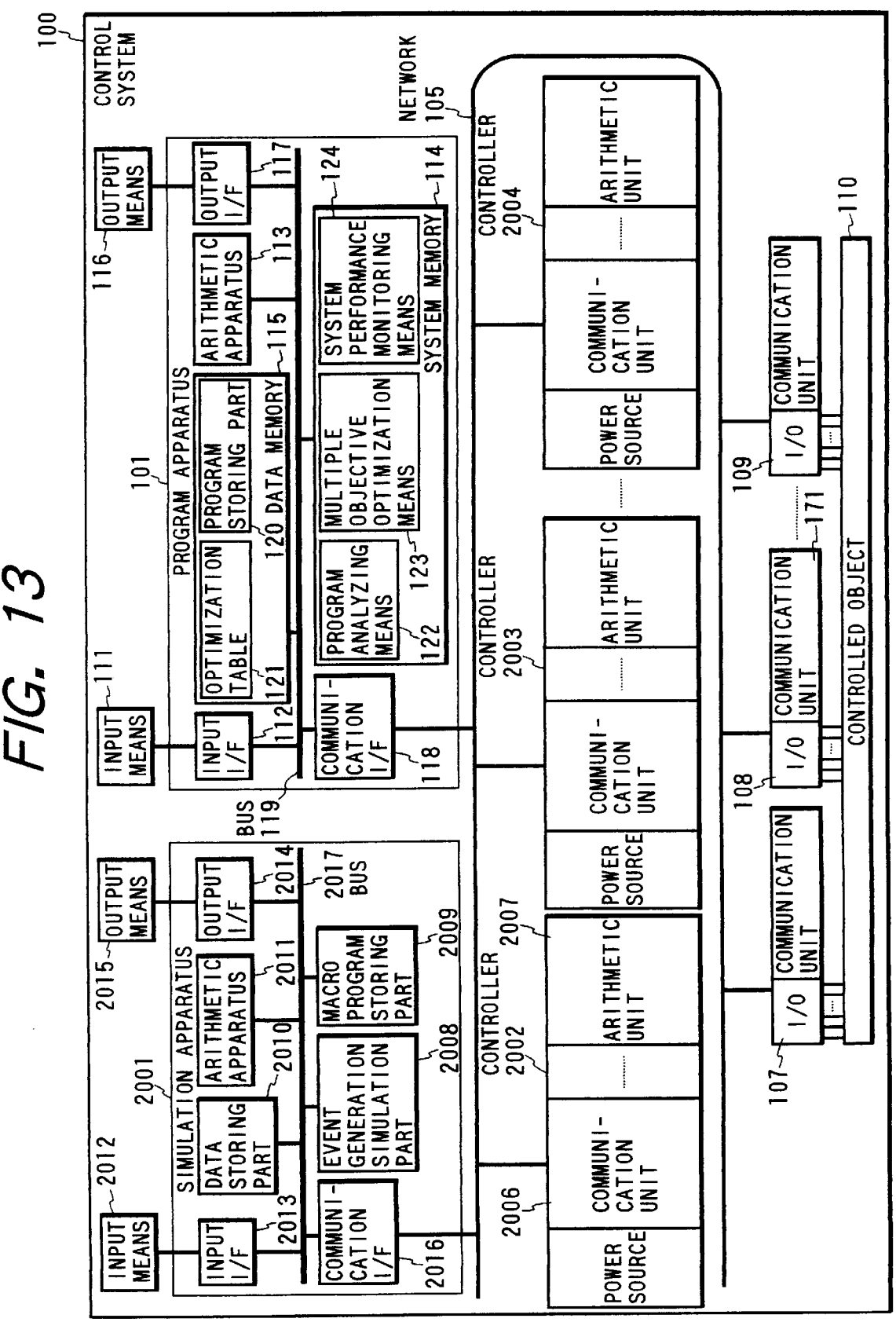
FIG. 13 is a configuration diagram of the distributed control system showing another embodiment of the present invention.

Now, referring to FIG. 13, the method for configuring another optimization table 121 is described. For example, it is supposed to apply the present invention to such a system as process controller where individual controllers 102 to 104 execute mainly the procedures handling the events supplied outside the system. In this case, the individual macro programs 1 to n are executed by the event issued by accepting the input signals from the controlled object 110 and the input device 111. This relates to the case in which the controllers 102 to 104 are realized by a programmable controller, an instrument loop controller, and an EIC controller. "EIC" controller (designating an integrated controller including functions for Electric control, Instrument control and Computer control), and is applicable to such a case that the amount of procedural operations for handling the events from outside could be neglected.

FIG. 13 is an embodiment showing the case that a simulation apparatus having a function for simulating the occurrence of events supplied from outside is installed, where the program apparatus 101 dispatches macro programs onto the plant controllers 2002 to 2004. The plant controllers 2003 to 2004 include at least a communication unit 2006 and an arithmetic unit 2007. The communication unit 2006 accepts the request signal inputted by the user from the input means 111 and even the signal generated by the controlled object 110. In case that the controlled object is a rolling system, as for the request signal, there is effected a procedure for capturing the real time data of the controlled object 110 by being initiated by the user's key input operation and a procedure for activating the program, being stored in either of the plant controllers 2002 to 2004, for estimating the rolling accuracy of the plate. As for the signal generated in the controlled object 110, there is a procedure for initiating and executing various control programs by being initiated at the arrival of the rolled material plate in the controlled object 110. The arithmetic unit 2007 executes those programs, presents the executed result to the user by displaying the result on the display means 116, and/or supplies the executed results to the controlled object 110, both through the communication unit 2006.

The simulation apparatus 2001 includes, the event generation simulation part 2008, the macro program storing part 2009, the data storing part 2010 for storing the data used for configuring the second table 126 in the optimization table 121. To the simulation apparatus 2001, the user directs the start-up and termination of the simulation procedure, the data transfer for the simulated result, both through the input means 2012. Those signals are transmitted to the arithmetic apparatus 2011 through the input I/F 2013 and the bus 2017. In addition, the simulated results are presented to the user through the bus 2017, the output I/F 2014 and the output means 2015, and also, are transferred to the program apparatus 101 through the communication I/F 2016 and the network 105 in order to be used for configuring the second table 126 in the optimization table 121.

Figures 14, 15:
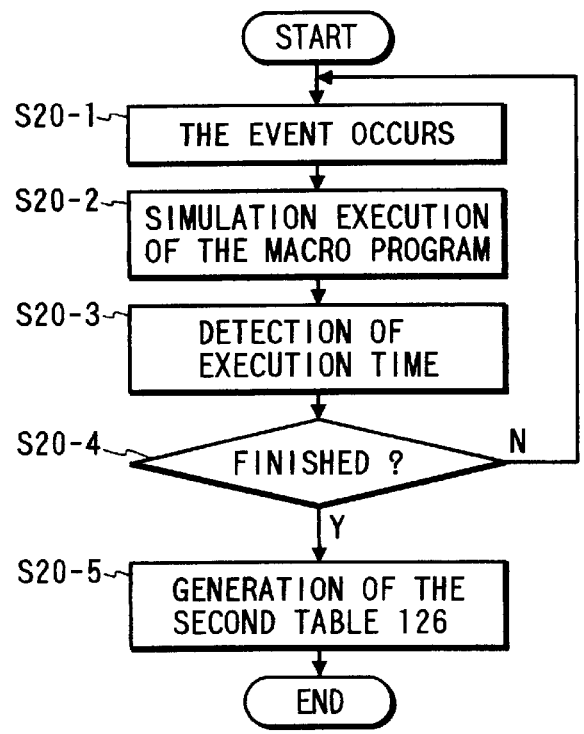
FIG. 14 is a flow chart of procedures executed by the arithmetic apparatus in the embodiment of FIG. 13.
FIG. 15 is a configuration diagram of the data storing part.

In FIG. 14, the procedures executed by the arithmetic apparatus 2011 are shown. At first, in Step S20-1, the event generation simulation part 2008 generates various events (relating to the abnormal procedures and the exception procedures are only done, for example, when parts materials are supplied to the roller), and events with the occurrence of requests by the user are inputted with the input means 111, both being as simulated signals. Next, in Step 20-2, the macro programs invoked by those events are extracted from the macro program storing part 2009, and executed as simulation. In Step S20-3, the execution time of this program is measured, and the measured value is stored in the data storing part 2010.

The structure of the data storing part 2010 is shown in FIG. 15. In the part 2010, the occurrence of events invoking their corresponding macro programs and the event handling time required for executing the corresponding macro program are recorded. For example, supposing that the event for invoking the macro program 1 arrives, the number of event occurrence corresponding to the macro program 1 is incremented by "1", and the execution time detected by the step S20-3 is newly added to the item in the event handling time. In Step S20-4, the termination of simulation is judged, and if the simulation is not terminated, the above procedures are repeated by going back to Step S20-1. If the simulation is terminated, the procedure for generating the second table 126 in the optimization table 121 is executed in Step S20-5. In this procedure, using the following formula, the expected value V of the time spent for executing the corresponding macro program in a unit time, is obtainable from a knowledge of the number N of event occurrences, the average value t of the event handling time, and the simulation time T.

$$V = N \times t + T(tT)$$

The value V corresponding to the individual macro program is transferred to the optimization table 121 in the program apparatus 101 through the network 105, and is stored there in the second table 126.

In this embodiment, the simulation apparatus 2001 is configured as an apparatus separated from the program apparatus 101, but both apparatus can be configured in a single apparatus unit. In addition, by unifying the plant controllers 2002 to 2003 and the program apparatus 101, one of the plant controllers 2002 to 2004 can thereby be configured as a simulation apparatus 2001. And furthermore, in the simulation apparatus 2001, it may be possible to effect a simulation capability so that there can be performed the case that a plurality of events can arise simultaneously, and to make the simulation result more precise.

Figure 16:
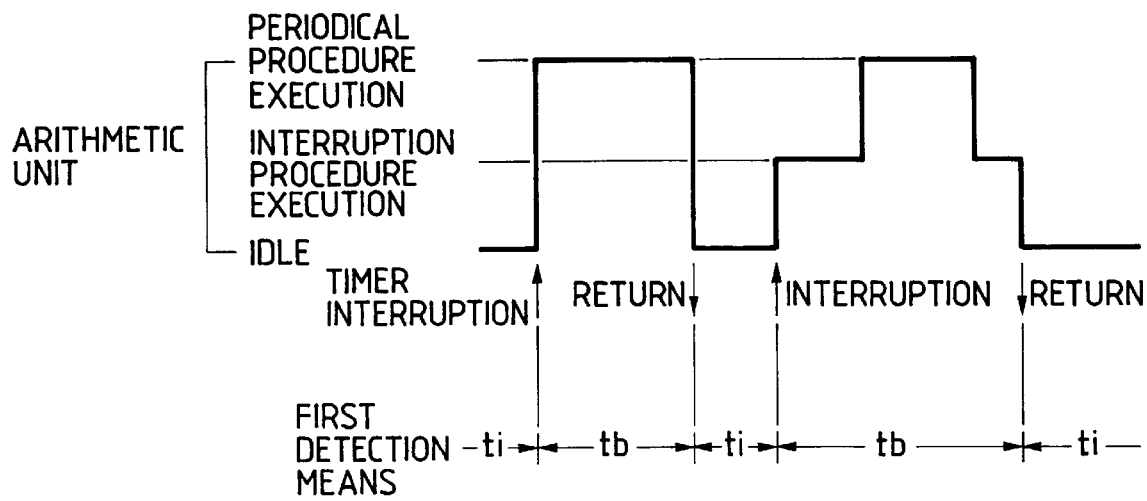
FIG. 16 is a time chart showing the detection method of the first detection means.
Figure 17:
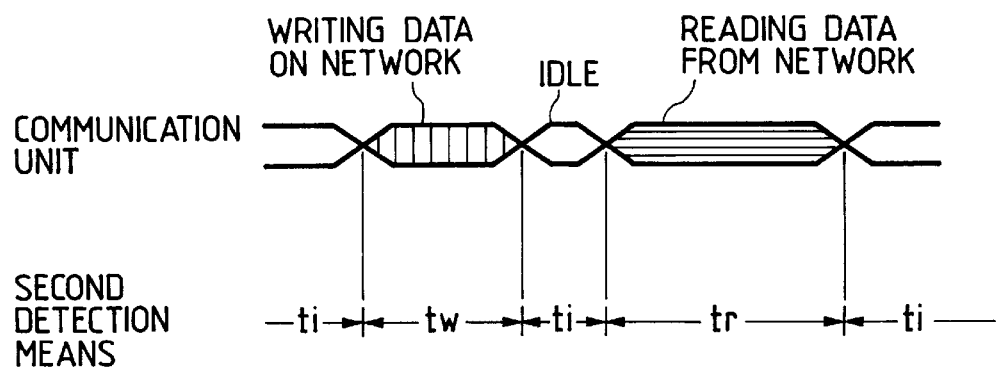
FIG. 17 is a time chart showing the detection method of the second detection means.

Next, referring to FIG. 16, the structure of the first detection means 154 installed in the arithmetic unit 152 of the controllers 102 to 104 is described. FIG. 16 shows the method of run-time measurement for the arithmetic unit 152 embedded in the first detection means 154 which detects the load rate and/or the margin of the procedural operations of the individual controllers.

The arithmetic unit 152 in the idle status ordinarily transfers its status into various status in responding to the issued events. For example, by being initiated by the timer interruption, the arithmetic unit starts the procedure to be executed periodically in a definite time interval. In responding to the external interruption signal, the arithmetic unit implements the interruption procedure. In case that those events and signals are issued simultaneously, the procedure with higher priority organized in a definite manner is selected to be used for execution. The first detection means 154 accumulates the time interval $t_i$, which is the time the arithmetic unit 152 is in the idle status and the time interval $t_b$, which is the time occupied for any procedural services, in a definite time interval, respectively. With the following formula 5, it is easy to calculate the load rate of the arithmetic unit 152 of the i-th controller.

$$(load)_i = \frac{\sum t_b}{\sum (t_b + t_j)} \quad \text{(Formula 5)}$$

i: the identification number of controller
S: the accumulation of time in a definite time interval Though this calculation with the formula 5 can be easily achieved by software procedures implemented as a part of OS (Operating System) in the arithmetic unit 152, much faster detection of the load rate can be made possible by adding a specific-purpose hardware apparatus.

The procedure done by the second detection means installed in the communication unit 151 of the controllers 102 to 104 is shown. The second detection means 153 for detecting the traffic of the network 105 and/or the occurrence of accessing data by the individual controllers 102 to 104 accumulates the time interval $t_w$, which is the time the communication unit 151 writes data into the network, and the time interval $t_c$, which is the time the communication unit 151 reads out data from the network, both in a definite time interval $T_c$. With the formula 6, it is possible to measure the effect of the communication unit 151 of the i-th controller over the network traffic.

$$(traf)_i = \frac{\sum t_w}{T_c} \quad \text{(Formula 6)}$$

i: the identification number of controller
S: the accumulation of time in a definite time interval The formula 7 enables to calculate the communication load of the communication unit 151.

$$(com)_i = \frac{\sum t_r}{T_c} \quad \text{(Formula 7)}$$

i: the identification number of controller
S: the accumulation of time in a definite time interval Though these calculations with the formula 6 and 7 can be easily achieved by software procedures implemented as a part of the OS (Operating System) in the arithmetic unit 152, much faster detection of the load rate can be made possible by adding a specific-purpose hardware apparatus. In case of extension to a plurality of arithmetic units and communication units installed in a single controller, it is easy to use these calculations only by adjusting the suffixes in the formulae.

Figure 18:
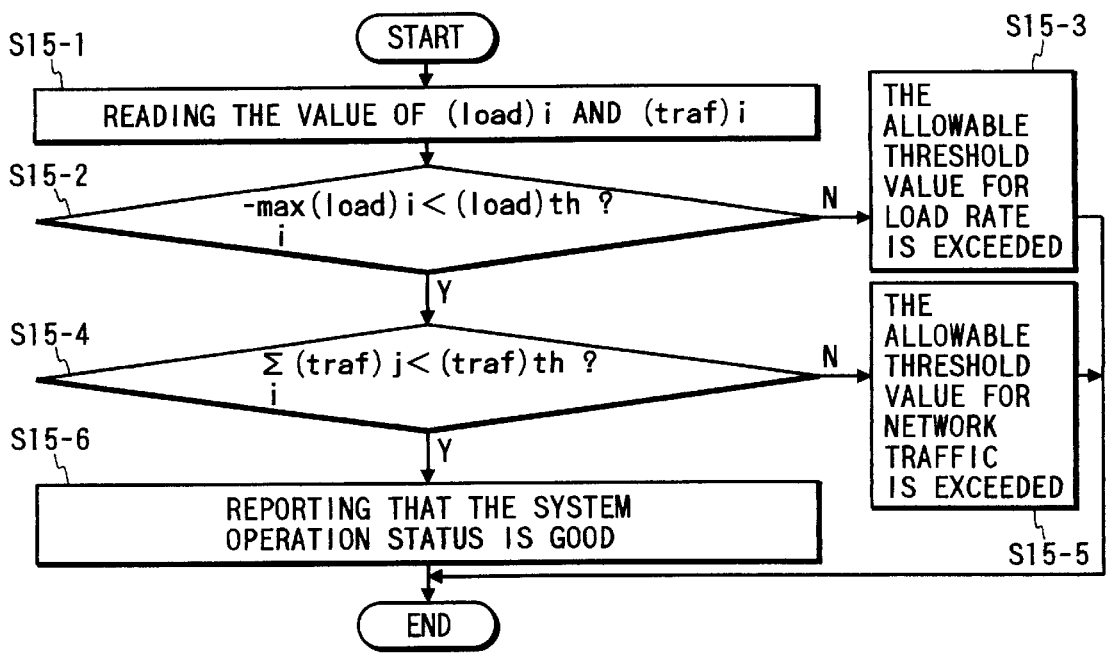
FIG. 18 is a flow chart of procedures executed by the control system operation status quantifying means.

In FIG. 18, what is shown is the algorithm for the procedure used in judging the operation status of the overall control system by the control system operation status quantifying means 161, using the information obtained by the first detection means 154 and the second detection means 153.

At first, in Step S15-1, the load rate (load)i and the influence coefficient (traf)i with respect to the network traffic are read out from the individual arithmetic unit 152 and the communication unit 151 of the controllers 102 to 1-4.

Next, in Step S15-2, whether the individual value of (load)i's does not exceed the allowable maximum threshold value (load)th is judged. If the detected value exceeds the threshold value, what is reported in Step S15-3 is that the system operation exceeds the maximum allowable network traffic. If the maximum has not been reached, the procedure goes to Step S15-4, which judges whether the summation of the influence coefficient of the individual communication units exceeds the allowable threshold traffic (traf)th.

If Step S15-4 judges that there is an excess over the threshold (traf)th, then the procedure in Step 15-5 is selected next, which reports when the network traffic is too high, and is followed by the allotment change means, to be described later. If not so, what is reported is that the operation status of the control system is fair. The above described judgment results are presented to the user by the output means 136 installed in the man-machine apparatus 106.

Figure 19:
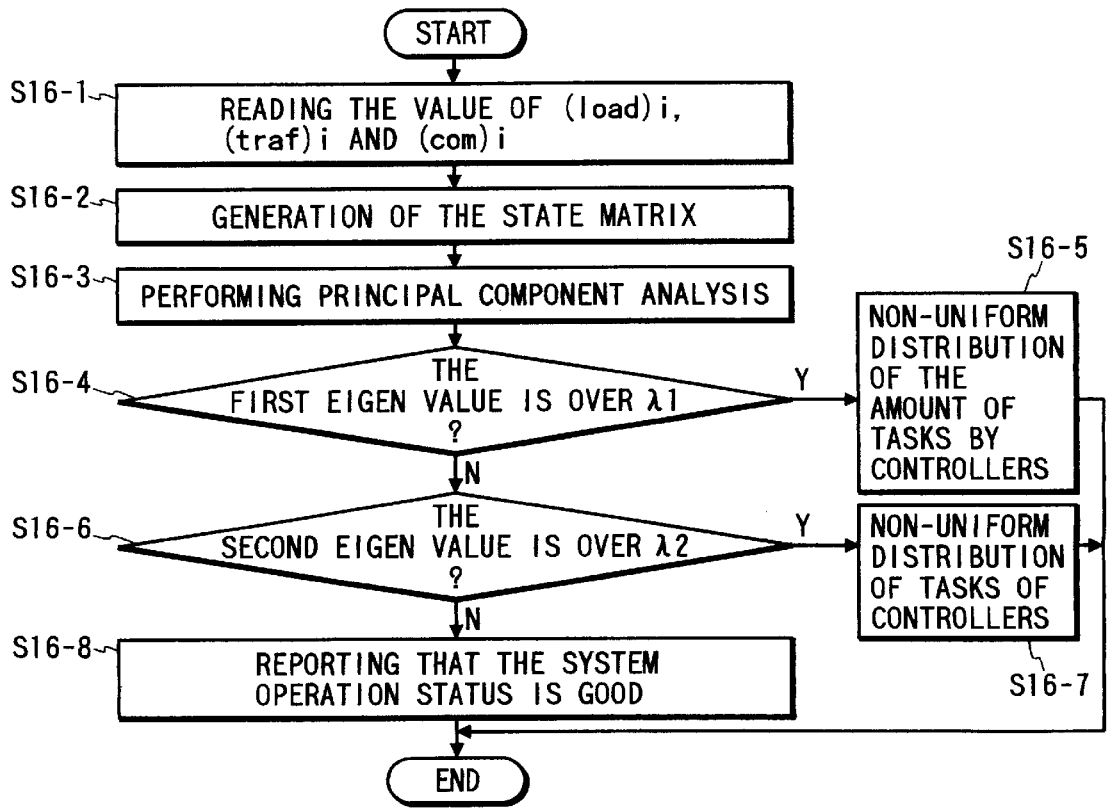
FIG. 19 is a flow chart of procedures for judging the system operation status.

In FIG. 19, another embodiment of the algorithm for quantifying the operation status of the control system is shown. Though the status of the individual arithmetic unit and the individual communication unit is judged element by element in FIG. 18, one embodiment of the procedures for judging the non-uniform distribution of dispatched macro programs over the controllers in a global view is shown in FIG. 19. At first, in Step S16-1, (com)i obtained from (load)i, (traf)i and the formula 7 is captured. The detected value to be captured may include other parameters.

Next, in Step S16-2, the state matrix defined as shown in the formula 8 is generated from those values.

$$\begin{bmatrix} (load)_1 & (load)_2 & \cdots & (load)_i & \cdots & (load)_m \\ (traf)_1 & (traf)_2 & \cdots & (traf)_i & \cdots & (traf)_m \\ (com)_1 & (com)_2 & \cdots & (com)_i & \cdots & (com)_m \end{bmatrix} \quad \text{(Formula 8)}$$

i: The identification number of controller
m; The number of controllers

In Step S16-3, by analyzing the state matrix with principal component analysis, the eigen value spectrums, 11, 12, 13 ($11 \geq 12 \geq 13$) are obtains. Detail description of major component analysis can be found in the literature "Regression Analysis and Principal Component Analysis" by Haga and Hashimoto, Nikka-Giren Publishing Co.. Though the number of sets of eigen values is "3" in this embodiment, the number of sets of eigen values is larger in case that the number of sampled data is larger. Supposing that 11 is the first eigen value and is the second eigen value, the first eigen value 11 corresponds to the degree of non-uniformity of the work load dispatched over the controllers 102 to 104 (the summation of the procedures occupied for load, data-write-down operation to the network, and data-read-out operation from the network). The second eigen value 12 represents the degree of heterogeneous characteristics of tasks done by the controller. For example, this heterogeneous characteristics of task allotment includes such a case of co-existence of controllers, one with high load rate and lower network access, and the other with low load rate and high network access.

In Step S16-4, judged is whether the first eigen value 11 is larger than its corresponding allowable threshold value $11_{th}$. If 11 is larger than $11_{th}$, Step S12-5 defines that there is no uniform distribution of tasks of controllers. If not so, next in Step S12-6, judged is whether the second eigen value 12 is larger than its corresponding allowable threshold value $12_{th}$. If 12 is larger than $12_{th}$, Step S12-7 defines that there is no uniform distribution of tasks of controllers. If not so, Step S12-8 concludes that the system operation status is good. Those results of judgment are presented to the user through the output means 136 installed in the man-machine apparatus 106.

There are various kinds of criteria for system operation status in global view, and, for example, the energy function E defined by the formula 1 may be used. The monitoring of the operation status of the control system realized by the procedure shown in FIG. 19 can be done in a definite period of time in responsive to timer setup, or may be activated by the user with the input means 131 for specifying the time for monitoring.

Figure 20:
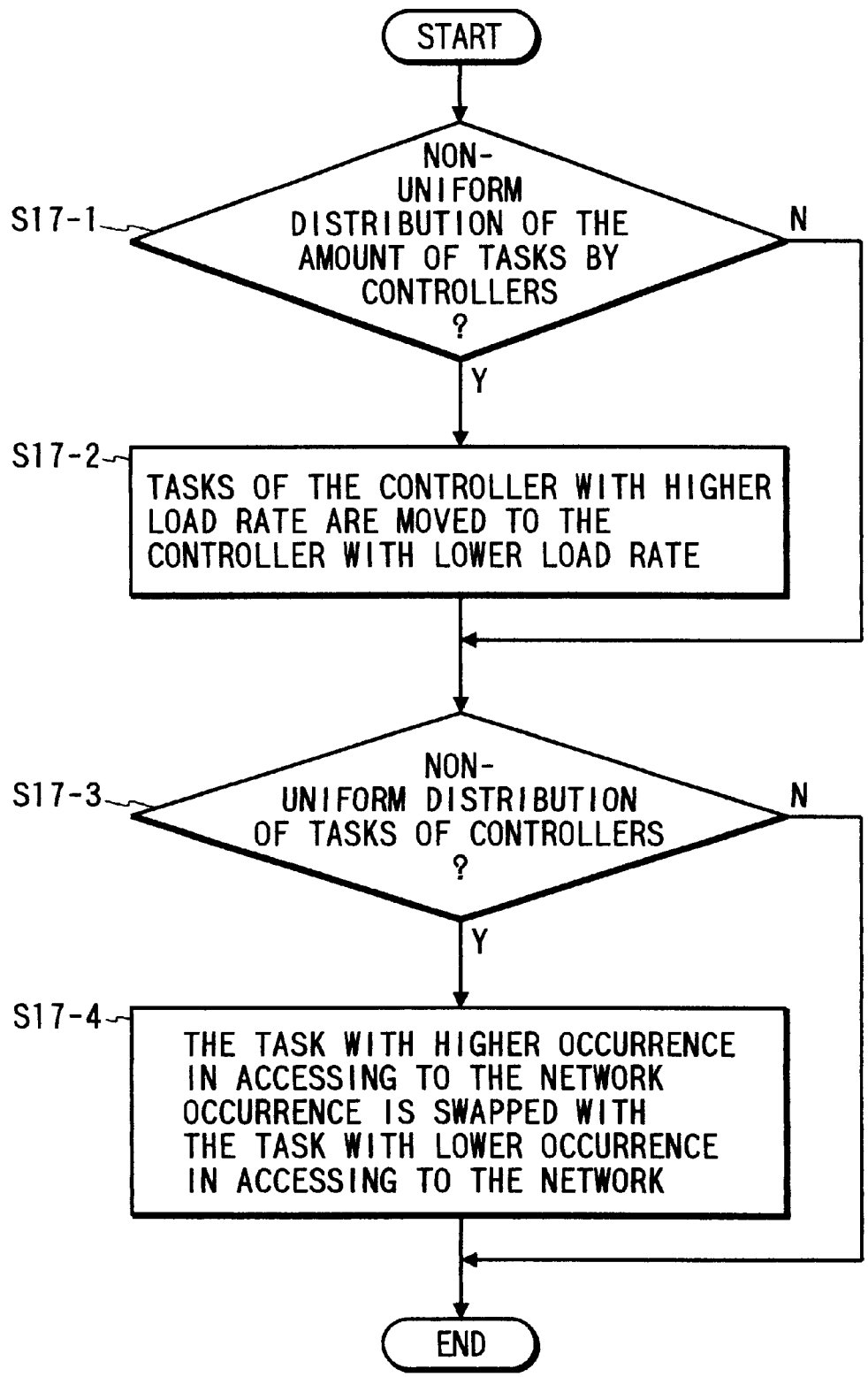
FIG. 20 is a flow chart of procedures executed by the allotment change means.

In FIG. 20, the algorithm executed by the allotment change means 162 is shown. This algorithm is invoked at the time when the operation status of the system is judged not to be good by the control system operation status quantifying means 161. At first, in Step S17-1, similarly to Step S12-5, judged is whether the bad condition of the system operation status is due to the non-uniform distribution of the amount of the tasks in the controllers. If so, in Step S17-2 for allotment change, some parts of the operations done by the controllers with higher load rate are transferred to the controllers with lower load rate . In Step S17-3, similarly to Step S12-7, judged is whether the bad condition of the system operation status is due to the non-uniform distribution of the contents of tasks themselves in the controllers. If Step S17-3 concludes that the non-uniform distribution of the contents of tasks occurs, in Step S17-4 for allotment change, some parts of the operations done by the controllers with higher occurrence for accessing to the network are exchanged with those in another controller with lower occurrence for accessing to the network. If there is no improvement in the performance of the control system 100, even if above described allotment changes were done, this situation is reported to the user through the bus 139, the output interface 137 and the output means 136.

Though, in the above embodiments, the man-machine apparatus 106 and the program apparatus 101 are individually configured in separate hardware components, it may be possible to configure those apparatus in a single unit of hardware component. It is allowed to make the control system comprise a plurality of man-machine apparatus 106 and a plurality of program apparatus 101, and to optimize distinctive functional parts of the control system with those apparatus.

According to the present invention, with respect to the set-up and start-up of the large-scale control system which requires much time, much labor and technical knowledge and expertise, the allotment of macro programs for control onto the controllers can be automated by using the optimization algorithm using the energy function. With respect to the definite controlled object, the number of controllers required to control the objects under a certain level of optimality, and the performance of the network can be explicitly estimated. In addition, by providing the estimated value of the energy function, the measure of the allotment result can be explicitly obtained, and the comparison of candidates of allotment change can be realized.

By making the controllers comprise a means for detecting the load rate and the network traffic, and by making the man-machine apparatus comprise a means for judging globally the operation status of the control system, the operation status of the control system even in working condition can be estimated, and thus, the operations of the individual controllers can be optimized.

We claim:

1. A distributed control system, having a plurality of controllers accepting information for a function specification of a controlled object and information for a status of said controlled object, comprising:

first detection means which detects a load rate of each of said controllers;

second detection means which detects a traffic of a network to which each of said controllers is connected;

arithmetic means which quantifies a control system operation status, based on an output of said first detection means and an output of said second detection means, and evaluates a quantified operation status; and allotment changing means which changes an allotment of a macro program onto said controller on the basis of an evaluated result, wherein a calculation for obtaining an extremal value of said function by varying the number of controllers in use is performed, wherein the number of controllers required to configure said distributed control system based on said obtained extremal value, a proper load rate of a controller defined by a user, and a network traffic is estimated, and wherein said estimated number of controllers is outputted.

2. A distributed control system having a plurality of controllers accepting information for a function specification of a controlled object and information for a status of said controlled object, comprising:

first detection means which detects a load rate of each of said controllers;

second detection means which detects a traffic of a network to which each of said controllers is connected;

arithmetic means which quantifies a control system operation status, based on an output of said first detection means and an output of said second detection means, and evaluates a quantified operation status;

allotment changing means which changes an allotment of a macro program onto said controller on the basis of an evaluated result; and display means for displaying information related to an allotment change of a procedural operation onto a respective controller, if an operation status of said controller is judged not to be good by judging an operation status of said controller from information obtained by said first detection means and said second detection means.

* * * * *